(12) United States Patent
Chiba

(10) Patent No.: US 6,512,859 B2
(45) Date of Patent: *Jan. 28, 2003

(54) ELECTRONIC LEVEL

(75) Inventor: Minoru Chiba, Kanagawa-ken (JP)

(73) Assignee: Sokkia Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,916

(22) Filed: Oct. 9, 1998

(65) Prior Publication Data

US 2002/0054716 A1 May 9, 2002

(30) Foreign Application Priority Data

Oct. 21, 1997 (JP) .............................. 9-288567

(51) Int. Cl.$^7$ ................................. G06K 7/00
(52) U.S. Cl. ..................... 382/312; 382/317; 210/739; 356/4.08
(58) Field of Search ................. 382/312, 317; 702/94; 356/4.08, 4.01; 33/293; 210/739; 348/208.8, 207.9

(56) References Cited

U.S. PATENT DOCUMENTS

| | | | | |
|---|---|---|---|---|
| 3,632,866 A | * | 1/1972 | King | 178/6.5 |
| 3,899,921 A | * | 8/1975 | Hockley | 73/67.2 |
| 4,006,627 A | * | 2/1977 | Bossaert | 73/67.8 |
| 4,787,248 A | * | 11/1988 | Polyakov et al. | 73/649 |
| 4,934,773 A | * | 6/1990 | Becker | 350/6.6 |
| 5,537,200 A | * | 7/1996 | Kumagai et al. | 356/4.08 |
| 5,537,201 A | * | 7/1996 | Kumagai et al. | 356/4.08 |
| 5,671,076 A | * | 9/1997 | Matsubara et al. | 359/196 |
| 5,742,378 A | * | 4/1998 | Kumagai et al. | 356/4.08 |
| 5,777,899 A | | 7/1998 | Kumagai | 364/571.02 |
| 5,982,525 A | * | 11/1999 | Matsubara et al. | 359/212 |
| 6,195,125 B1 | * | 2/2001 | Udagawa et al. | 348/222 |
| 6,219,145 B1 | * | 4/2001 | Gutierrez et al. | 356/498 |

FOREIGN PATENT DOCUMENTS

| | | | | |
|---|---|---|---|---|
| JP | 60-97208 | 5/1985 | ............ | G01C/5/00 |
| JP | 5-18042 | 3/1993 | ............ | G01C/15/00 |
| JP | 7-4959 | 1/1995 | ............ | G01C/5/00 |
| JP | 7-229737 | 8/1995 | ............ | G01C/5/00 |
| JP | 9-145358 | 6/1997 | ............ | G01C/1/02 |

* cited by examiner

Primary Examiner—Anh Hong Do
(74) Attorney, Agent, or Firm—Arent Fox Kintner Plotkin & Kahn PLLC

(57) ABSTRACT

A vibration sensor is provided in a telescope. When vibrations are detected by the vibration sensor, the vibrating state of a reflecting mirror is estimated by the vibration sensor. When an image signal is captured by an image sensor, the frequency or period of capturing the image signal is varied depending on the state of vibrations of the reflecting mirror. In this manner, the time required for measurement is shortened, or the measuring error due to the swinging of the reflecting mirror is minimized.

9 Claims, 3 Drawing Sheets

ELECTRONIC LEVEL

BACKGROUND OF THE INVENTION

1. Field of the Invention

The present invention relates to an electronic level in which a light compensated by a compensator provided inside a telescope is received by an image sensor and a horizontal sighting position code is obtained by computation.

2. Description of the Related Art

As this kind of electronic level, there has been known the following in Japanese Published Unexamined Patent Application No. 4959/1995. Namely, the light which is incident from an objective lens is passed through a compensator. The light is thereafter introduced into an image sensor and is converted into an image signal. The image signal is then captured by (or taken in) a computation section to thereby compute the height of the horizontal sighting position code.

As is well known, the compensator is provided with reflecting mirrors which are swingably hung by a hanging wire. The light which is incident from the objective lens is once reflected by the reflecting mirrors. In this manner, even if the telescope is inclined in the up and down direction (i.e., relative to an optical axis of the telescope), the inclination of the telescope is compensated by the automatic inclination of the reflecting mirrors by an amount in proportion to the inclination of the telescope.

Since the above-described conventional electronic level is provided with a compensator, if the telescope swings, the reflecting mirrors of the compensator also swing. As a result, the light to reach the image sensor thereby becomes an unstable condition. Then, depending on the timing in which the computing section captures the image signal, the image signal of the position that is away from the position to be collimated horizontally will be captured. There is therefore a possibility that the error of the collimated position to be computed becomes extremely large. In such a case, the following solution may be considered. Namely, the time (or duration) in which the computation section captures the image signal is extended or the number (or frequency) of capturing is increased to thereby increase the number of image signals to be captured by the computation section. However, this solution is not preferable because unnecessarily long time is required for capturing the image signals even when the reflecting mirror does not swing.

In view of the above points, the present invention has an object of providing an electronic level in which an error in the computing results due to swinging can be minimized without unnecessarily extending the measuring time.

SUMMARY OF THE INVENTION

In order to attain the above and other objects, according to one aspect of the present invention, there is provided an electronic level in which light incident from an objective lens is passed through a compensator and is introduced into an image sensor to convert it to an image signal, the image signal being captured by a computing processing section to thereby compute a horizontal collimation position. The electronic level comprises vibration detecting means provided inside a main body of the electronic level, wherein number of captured image signals by the computing processing section is varied to increase or decrease depending on the magnitude of compensator mirror amplitude of vibrations detected by the vibration detecting means.

According to another aspect of the present invention, there is provided an electronic level in which light incident from an objective lens is passed through a compensator and is introduced into an image sensor to convert it to an image signal, the image signal being captured by a computing processing section to thereby compute a horizontal collimation position. The electronic level comprises vibration detecting means provided inside a main body of the electronic level, wherein the cycle of captured image signals by the computing processing section is varied to be long or short depending on the length of compensation mirror cycles of vibrations detected by the vibration detecting means.

According to still another aspect of the present invention, there is provided an electronic level in which light incident from an objective lens is passed through a compensator and is introduced into an image sensor to convert it to an image signal, the image signal being captured by a computing processing section to thereby compute a horizontal collimation position. The electronic level comprises: vibration detecting means provided inside a main body of the electronic level; and indicating means to indicate that the computation in the computing processing section cannot be performed when vibrating state to be detected by the vibration detecting means has exceeded a predetermined limit state.

By providing the vibration detecting means, the vibrations actually operating on the electronic level are detected. When the amplitude of the vibrations is large, the number of captured image signals by the computing processing section is increased to thereby minimize the error due to the operation of the vibrations. On the other hand, if the amplitude of the vibrations is small and if there is no possibility of occurrence of an error due to the vibrations, the number of captured image signals by the computing processing section is reduced to thereby shorten the time required for measuring.

If the amplitude of the vibrations which operate on the electronic level does not vary, there is no need of increasing or decreasing the number of capturing the image signal by the computing processing section. If the period of vibrations is short, the measuring accuracy does not change even if the number of capturing the image signal by the computing processing section is shortened depending on the period of the vibrations. In this manner, if the period of capturing the image signal is shortened, the time required to obtain the measuring result can be shortened. On the other hand, if the period of vibrations is long, it is necessary to extend the period of capturing the image signal. As a result, the time until the measuring result can be obtained becomes longer. However, as compared with the conventional art in which the period of capturing the image signal is not changed so as to become longer, the measuring accuracy of the present invention can be improved.

In case the conditions of vibrations which operate on the electronic level, e.g., the amplitude and the period, exceed a predetermined limit state which is set as a limit beyond which measuring cannot be made, the measured result will not be indicated or, even if indicated, the values indicated are not reliable. However, until a considerable time has passed, it is difficult to judge whether the above-described state is present or not. As a solution, when the vibration state to be detected by the detecting means has exceeded a predetermined state, an indication is immediately made to that effect without performing the computation.

As the vibration detecting means, a telescope may be separately provided with a vibration sensor. However, the vibration detecting means may be constituted by a light irradiating section to irradiate light to a reflecting mirror of the compensator, and a line sensor which receives the light irradiated from the light irradiating section and reflected by the reflecting mirror. In a state in which the reflecting mirror is swinging, the position in which the light reaches the line sensor varies Therefore, the vibration state of the reflecting mirror can thus be detected.

If the reflecting mirror is swinging, the image to reach the image sensor swings. Therefore, the state of swinging can be detected from the image signal.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
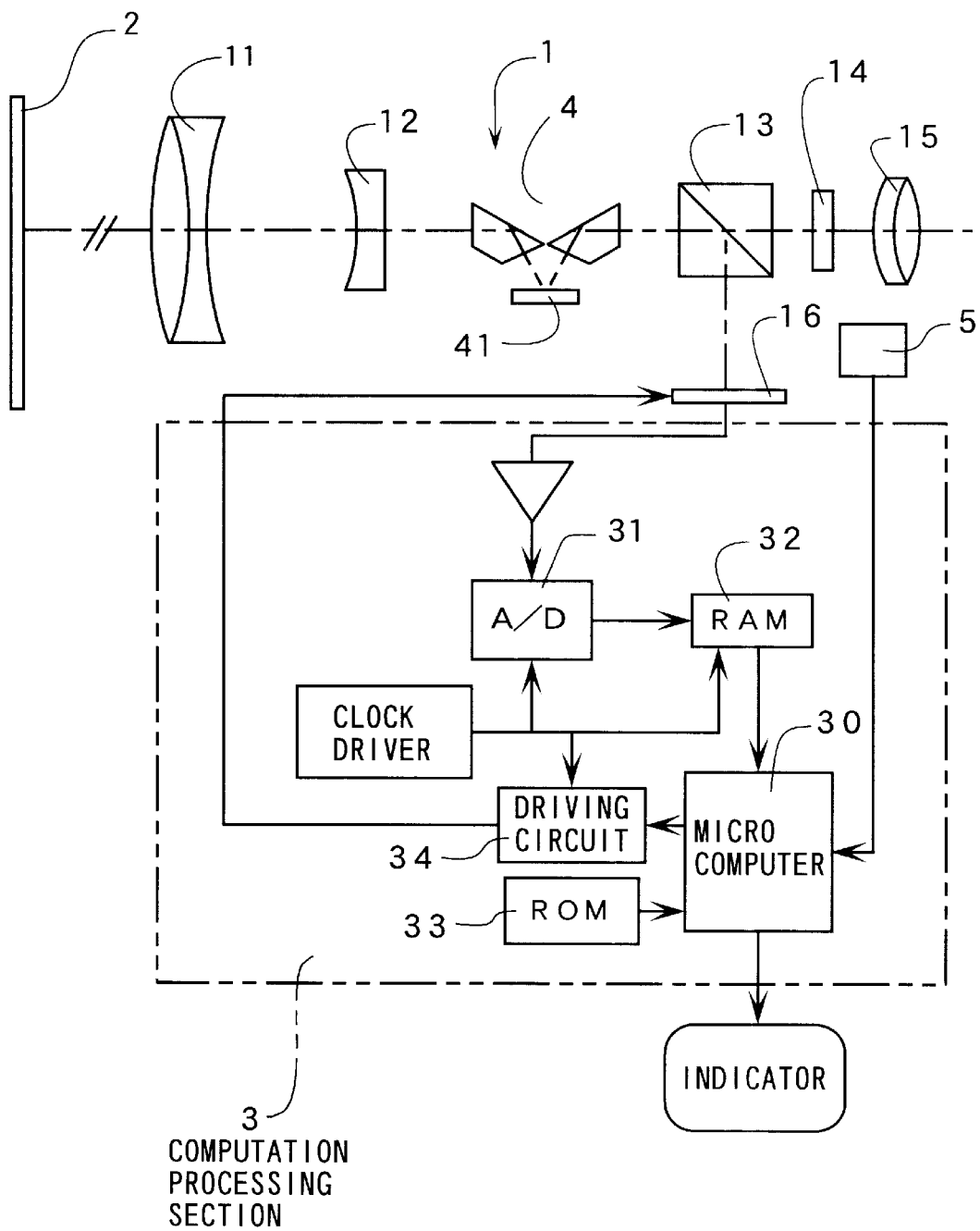
FIG. 1 is a schematic diagram to show an approximate constitution of the electronic level to which the present invention is applied.

With reference to FIG. 1, reference numeral 1 denotes an optical system of a telescope. The optical system is to collimate the horizontal position of a levelling rod 2 which is vertically disposed in a measuring point which is located in front of the telescope. The image sensor of the telescope converts the image of the levelling rod 2 into an image signal in the form of an electronic signal, and outputs it to a computation processing section 3. The electronic level according to the present invention is constituted by the telescope and the computation processing section 3. Inside the telescope, there are disposed from the front end backward the following in the order mentioned, i.e., an objective lens 11, a focusing lens 12, a beam splitter 13, a focusing plate 14, and an eyepiece 15. Between the focusing lens 12 and the beam splitter 13, there is disposed a compensator 4. It is thus so arranged that, even if the telescope is inclined to some degree in the up and down direction (i.e., relative to an optical axis of the telescope), the levelling rod 2 can be collimated through compensation by the compensator 4. Though not illustrated, the focusing plate 14 is provided with a crossing line for collimation purpose. It is also so arranged that the image of the levelling rod 2 is branched, via the beam splitter 13, to an image sensor 16 which is disposed on a side relative to the optical axis of the telescope. The image sensor 16 converts the image of the collimated levelling rod 2 into an image signal which is in the form of an electric signal, and outputs it to the computation processing section 3. The image signal that is outputted from the image sensor 16 is digitized in an analog/digital (A/D) converter 31 and is thereafter stored in a random access memory (RAM) 32. In the computation processing section 3, a microcomputer 30 for performing the computation processing has connected thereto the above-described RAM 32, a read-only memory (ROM) 33, and a driving circuit 34 for the image sensor 16. As the image sensor 16, a charge-coupled device (CCD) or a metal oxide semiconductor (MOS) type CCD is used. In the present embodiment, as the vibration detecting means, a vibration sensor 5 is attached to the telescope. A detected signal from the vibration sensor 5 is inputted into the microcomputer 30.

At the time of capturing the image signal from the image sensor 16, the above-described computation processing section 3 is arranged, in order to minimize an error, to capture the image signal continuously for a predetermined period of time to thereby average the image signal itself. The capturing of the image signal continued for a predetermined period of time is performed for a predetermined number of times. An average value of the computation of each time of capturing is obtained. The microcomputer 30 monitors an output signal of the vibration sensor 5 prior to the timing of capturing the image signals.

Figure 2:
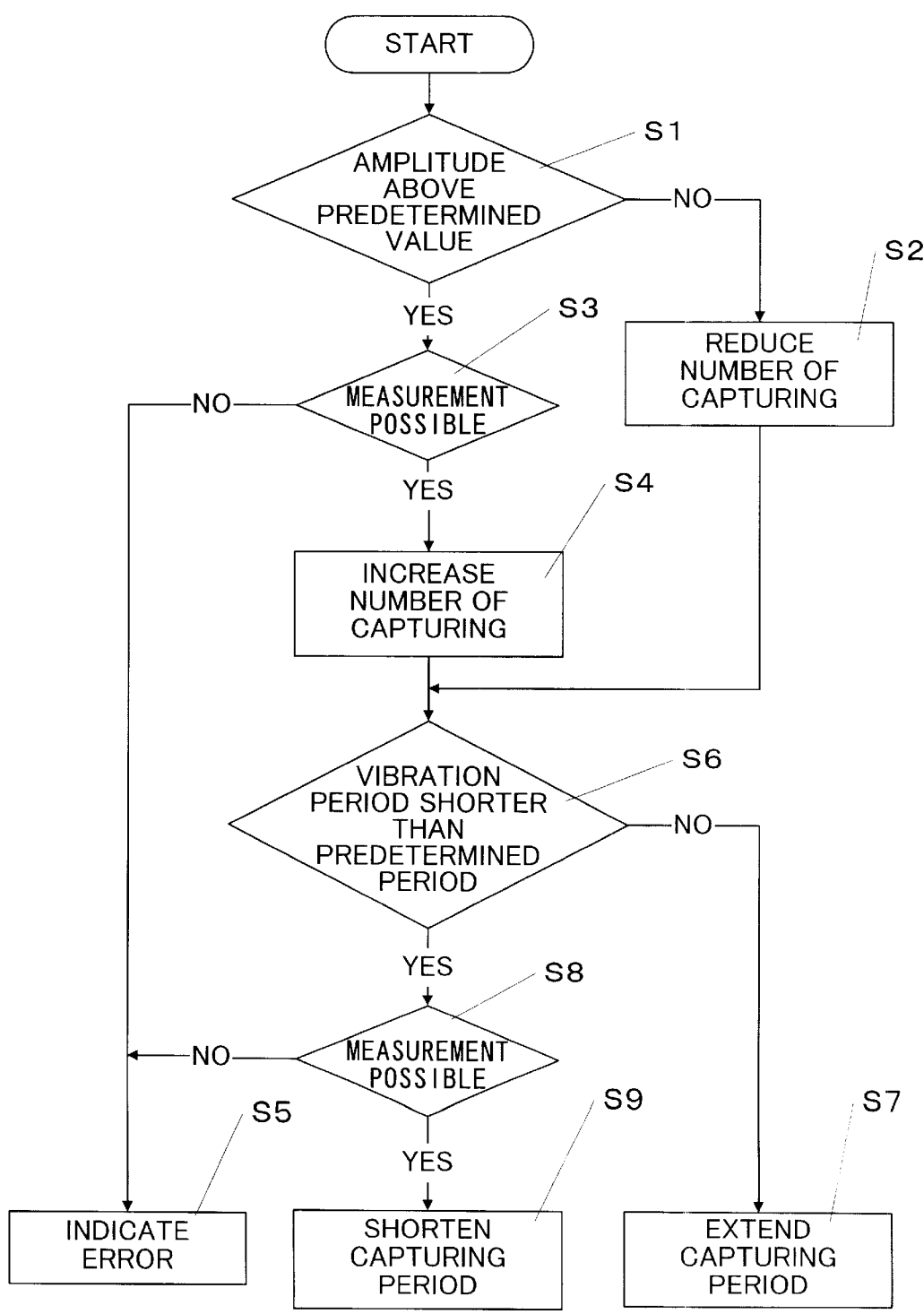
FIG. 2 is a processing flow chart to change the state of capturing the image signal.

With reference to FIG. 2, when the image signal is captured, the vibration at the time of capturing the image signal is detected prior to the capturing of the image signal. Then, a discrimination is made as to whether the amplitude of the vibration is above a predetermined value or not (S1). If the amplitude of the vibration is below the predetermined value, a judgement can be made that the reflecting mirror 4 is not swinging. Therefore, the frequency (or number) of capturing is reduced to thereby shorten the time required for the computation (S2). On the other hand, if the amplitude is above the predetermined value, a judgement is made whether the measurement can be made in a state in which the vibration at the specific amplitude is actually operating (S3). If a judgment is made that the measurement cannot be made, the subsequent computation work is stopped and an indication of an error is made (S5). The judgement as to whether the measurement can be made or not is made as follows. Namely, a limit value which is larger than the above-described predetermined value is set in advance. When the detected amplitude has exceeded the limit value, a judgement is made that the measurement cannot be made. On the other hand, when a judgement has been made that the measurement can be made, the frequency of capturing is increased in order to reduce the error by the effect of the vibration (S4). Once the increase or decrease in the frequency of capturing has been decided as described above, a judgement is made as to whether the period of the detected vibration is shorter than a predetermined period (S6). In case the period of the vibration is long, there is a possibility that the state at the time of capturing the image signal becomes partial if the period (or frequency) of capturing the image signal is short, with the result that the measured result deviates. As a solution, when the period of the vibration is long, the period of capturing the image signal is made long (S7). On the other hand, if the period of the vibration becomes short beyond the limit period, the measurement becomes impossible. In such a case, the subsequent computing processing is stopped and an indication of an error is made (S8, S5). If the measurement can be made, the image signal is captured. At this time, if the period of the vibration is short, the state in which the image signal is captured does not deviate even if the period of capturing is made short. Therefore, when the period of the vibration is short, the period of capturing the image signal is compressed or made shorter (S9). In the flow chart shown in FIG. 2, the amplitude and the period of the vibration are compared with the predetermined values or the predetermined period (S1, S6). The following arrangement may also be made. Namely, values which are further divided into minute units or segments are set. Then, the capturing number (or frequency) or the capturing period which corresponds to each of the values is stored as a table value.

Figure 3:
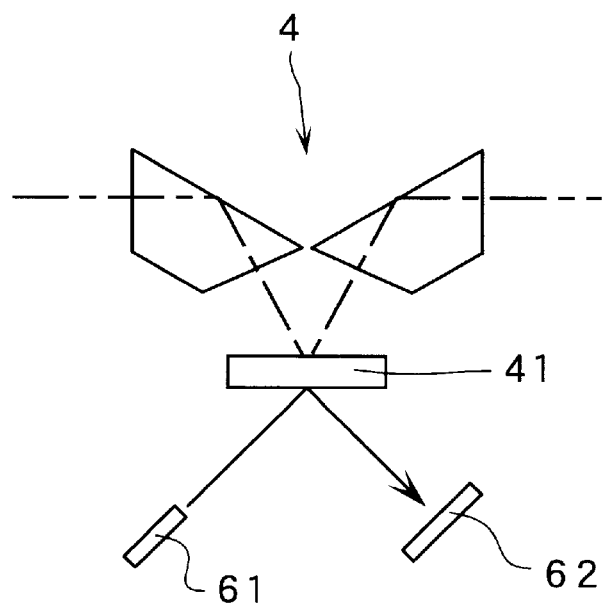
FIG. 3 is a schematic diagram to show the constitution of detecting the swinging state of the reflecting mirror.

In the above-described embodiment, the vibration sensor 5 is used. However, the vibration sensor 5 cannot directly detect the swinging condition of the reflecting mirror 41. As a solution, an arrangement as shown in FIG. 3 may also be made. Namely, the reflecting mirror 41 of the compensator 4 is arranged to have reflecting surfaces on both the upper and lower surfaces. There are further provided a light projecting section 61 which irradiates light onto the lower surface of the reflecting mirror 41, and a line sensor 62 which receives the light that is reflected from the lower surface of the reflecting mirror 41. The swinging state of the reflecting mirror 41 may thus be directly detected. If the reflecting mirror 41 is in a stationary state, the position at which the light reaches the line sensor 62 does not move. If, on the other hand, the reflecting mirror 41 is in a swinging state, the position at which the light reaches the line sensor 62 fluctuates. Therefore, when the reflecting mirror 41 does not swing but is kept stationary, the number of capturing is decreased as in the above-described step S2. When the width (amplitude) of swinging is large, the number of capturing is increased as in the above-described step S4. When the width of swinging is still larger, an indication of error is made as in step S5 and no further capturing of the image signal is performed. In the above-described embodiment, the light of the light projecting section 61 is reflected on the lower surface of the reflecting mirror 41. It may, however, be so arranged that the light incident from the objective lens 11 is reflected on the upper surface of the reflecting mirror 41 like the light which is incident from the objective lens.

If the reflecting mirror 41 is swinging, the coordinate values of the image to be recognized by the image signal which is outputted from the image sensor 16 fluctuate. Therefore, the following arrangement may also be made. Namely, the image sensor 16 is used as the vibration detecting means. Irrespective of whether the reflecting mirror 41 is swinging or not, the image signal is once captured to thereby detect the swinging state of the reflecting mirror 41 from the coordinate values of the image to be recognized by the image signal.

Figure 4:
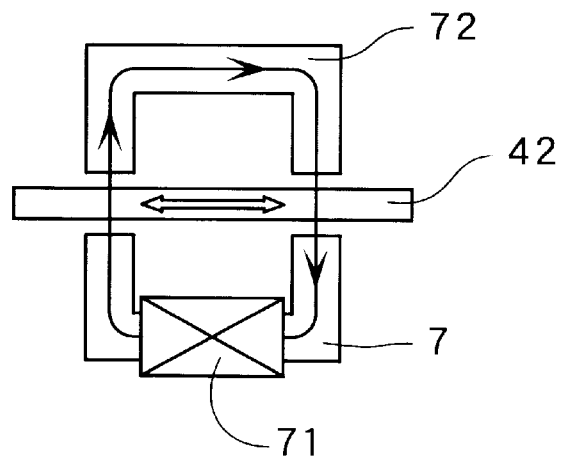
FIG. 4 is a schematic diagram to show the constitution of operating the restraining force to the restraining plate.

If the reflecting mirror 41 swings, it is necessary to immediately restrain the reflecting mirror 41. Therefore, there is conventionally provided a restraining device in which a restraining plate made of a non-magnetic material with an electric conductivity such as copper is provided integrally with the reflecting mirror 41, and in which a permanent magnet is arranged to lie opposite to the restraining plate in a contact-free manner. If the reflecting plate swings, the restraining plate crosses the magnetic field which is formed by the permanent magnet. As a result, a swirl electric current is induced inside the restraining plate whereby a restraining force is operated on the restraining plate. However, if the permanent magnet is used as in the above-described conventional arrangement, the restraining force that operates on the restraining plate cannot be variably controlled. Therefore, as shown in FIG. 4, the following arrangement has been made in the present embodiment. Namely, an electromagnet 7 is disposed opposite to a restraining plate 42. The electric current value to be charged to an electromagnetic coil 71 of the electromagnet 7 is controlled by the microcomputer 30 so that the restraining force to operate on the restraining plate 42 can be controlled to be increased or decreased. Therefore, when the swinging width of the reflecting mirror 41 is large or when the vibrations are frequently transmitted, the electric current value to be charged to the electromagnetic coil 71 is increased to particularly strongly restrain the restraining plate 42. In the figure, reference numeral 72 denotes a core for operating the magnetic flux to the restraining plate 42 at right angles.

As has been explained hereinabove, according to the present invention, the number of capturing the image signal by the computing processing section is increased or decreased depending on the state of the vibrations to be transmitted to the telescope of the electronic level. Or else, the period of capturing the image signal is varied to be long or short. Therefore, it is possible to shorten the measuring time or to guarantee the measuring accuracy depending on the vibrating conditions. Further, if the measuring cannot be made, the subsequent computation is no longer made, but an indication is made to that effect. Therefore, the fact of being incapable of measuring can be known quickly.

It is readily apparent that the above-described elecronic level meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An electronic level in which incident light from an objective lens is passed through a compensator and is introduced into an image sensor to convert it to an image signal, said image signal being captured by a computer processing section to thereby compute a horizontal collimation position, said electronic level comprising:

vibration detecting means provided inside a main body of the electronic level;

wherein a number of captured image signals by said computing processing section is varied to increase or decrease depending on the magnitude of compensator mirror amplitude of vibrations detected by said vibration detecting means.

2. An electronic level according to claim 1, wherein said vibration detecting means is constituted by said image sensor.

3. An electronic level in which light incident from an objective lens is passed through a compensator and is introduced into an image sensor to convert it to an image signal, said image signal being captured by a computing processing section to thereby compute a horizontal collimation position, said electronic level comprising:

vibration detecting means provided inside a main body of the electronic level;

wherein a cycle of captured image signals by said computing processing section is varied to be long or short depending on the length of compensator mirror cycles of vibrations detected by said vibration detecting means.

4. An electronic level according to claim 3, wherein said vibration detecting means is constituted by said image sensor.

5. An electronic level in which light incident from an objective lens is passed through a compensator and is introduced into an image sensor to convert it to an image signal, said image signal being captured by a computing processing section to thereby compute a collimation position, said electronic level comprising:

vibration detecting means provided inside a main body of the electronic level; and indicating means to indicate that the computation in said computing processing section cannot be performed when vibrating state of compensator mirror to be detected by said vibration detecting means has exceeded a predetermined limit state.

6. An electronic level according to claim 5, wherein said vibration detecting means is constituted by a light irradiating section to irradiate light to a reflecting mirror of said compensator, and a line sensor which receives the light irradiated from said light irradiating section and reflected by said reflecting mirror.

7. An electronic level according to claim 5, wherein said vibration detecting means is constituted by said image sensor.

8. An electronic level in which incident light from an objective lens is passed through a compensator and is introduced into an image sensor to convert it to an image signal, said image signal being captured by a computer processing section to thereby compute a horizontal collimation position, said electronic level comprising:

vibration detecting means provided inside a main body of the electronic level;

wherein a number of captured image signals by said computing processing section is varied to increase or decrease depending on the magnitude of compensator mirror amplitude of vibrations detected by said vibration detecting means, and wherein said vibration detecting means is constituted by a light irradiating section to irradiate light to a reflecting mirror of said compensator, and a line sensor which receives the light irradiated from said light irradiating section and reflected by said reflecting mirror.

9. An electronic level in which light incident from an objective lens is passed through a compensator and is introduced into an image sensor to convert it to an image signal, said image signal being captured by a computing processing section to thereby compute a horizontal collimation position, said electronic level comprising:

vibration detecting means provided inside a main body of the electronic level;

wherein a cycle of captured image signals by said computing processing section is varied to be long or short depending on the length of compensator mirror cycles of vibrations detected by said vibration detecting means, and wherein said vibration detecting means is constituted by a light irradiating section to irradiate light to a reflecting mirror of said compensator, and a line sensor which receives the light irradiated from said light irradiating section and reflected by said reflecting mirror.

* * * * *